Feb. 17, 1942.  R. G. OHLINGER  2,273,372
FABRIC TRANSFER DEVICE AND THE LIKE AND METHOD OF MANIPULATING FABRIC
Filed Sept. 2, 1937  8 Sheets-Sheet 1

INVENTOR:
Robert G. Ohlinger,
BY
ATTORNEY.

Feb. 17, 1942.                R. G. OHLINGER                2,273,372
        FABRIC TRANSFER DEVICE AND THE LIKE AND METHOD OF MANIPULATING FABRIC
                    Filed Sept. 2, 1937          8 Sheets-Sheet 2

INVENTOR:
Robert G. Ohlinger,
BY
        ATTORNEY.

Feb. 17, 1942.  R. G. OHLINGER  2,273,372
FABRIC TRANSFER DEVICE AND THE LIKE AND METHOD OF MANIPULATING FABRIC
Filed Sept. 2, 1937  8 Sheets-Sheet 3

INVENTOR:
Robert G. Ohlinger,
BY
ATTORNEY.

Feb. 17, 1942. R. G. OHLINGER 2,273,372
FABRIC TRANSFER DEVICE AND THE LIKE AND METHOD OF MANIPULATING FABRIC
Filed Sept. 2, 1937 8 Sheets-Sheet 4

INVENTOR:
Robert G. Ohlinger,
BY
ATTORNEY.

Feb. 17, 1942.  R. G. OHLINGER  2,273,372
FABRIC TRANSFER DEVICE AND THE LIKE AND METHOD OF MANIPULATING FABRIC
Filed Sept. 2, 1937  8 Sheets-Sheet 5

INVENTOR:
Robert G. Ohlinger,
BY
ATTORNEY.

Feb. 17, 1942.　　　R. G. OHLINGER　　　2,273,372
FABRIC TRANSFER DEVICE AND THE LIKE AND METHOD OF MANIPULATING FABRIC
Filed Sept. 2, 1937　　　8 Sheets-Sheet 7

INVENTOR:
Robert G. Ohlinger,
BY
ATTORNEY.

Feb. 17, 1942.    R. G. OHLINGER    2,273,372
FABRIC TRANSFER DEVICE AND THE LIKE AND METHOD OF MANIPULATING FABRIC
Filed Sept. 2, 1937    8 Sheets-Sheet 8

INVENTOR:
Robert G. Ohlinger
BY
Alfred E. Ohlinger
ATTORNEY.

Patented Feb. 17, 1942

2,273,372

UNITED STATES PATENT OFFICE 2,273,372

FABRIC TRANSFER DEVICE AND THE LIKE AND METHOD OF MANIPULATING FABRIC

Robert G. Ohlinger, West Reading, Pa., assignor to Textile Machine Works, Wyomissing, Pa., a corporation of Pennsylvania Application September 2, 1937, Serial No. 162,128

19 Claims. (Cl. 66—148)

My invention relates to a method of, and means for, manipulating yarn loops at a position of transition from one fabric area to another, as at an instep course of a full fashioned stocking blank in progressing from the leg portion to the foot portion.

In forming a full fashioned stocking from a blank of one form, the free end edges of the heel tabs are looped to each other along the back of the stocking, and separate seams subsequently made from the toe to one end of the thus looped edges and, from the other end of the looped edges, to the top or welt edge of the stocking, thus requiring a looping operation usually effected by one operator and a seaming operation effected by another operator, and forming the familiar peak at the center of the rounded heel portion.

A full fashioned stocking of another form is produced by narrowing the blank in the heel tabs differently from the narrowing usually made in the heel tabs by a legger machine, placing the instep loops, the inside selvage edges of the heel tabs and the narrowed free end course portions of the heel tabs directly on a rigid topping bar for transfer to a footer machine whereby to knit the foot portion, substantially reduce the above mentioned peak, avoid the above mentioned looping operation in the heel portion, and provide a complete blank which can be seamed along the back of the stocking in a single continuous operation.

However, so far as I am aware, it has not been suggested, prior to my invention, to provide any mechanism whereby to place the last, or free end, course portions of the heel tabs on any loop manipulating implements, such as needles or points, except those mounted directly in a series or row fixed in line with all the other loop manipulating implements. This lack has definite disadvantages in the irregular and non-uniform strain on the fabric adjacent to the juncture of the inside selvage edges of the heel tabs with the last course portions of the tabs, in addition to the inconvenience, delay, defective fabric and other undesirable features and expense incident to placing these course portions in line with the instep loops and inside selvage edges of the tabs for knitting the foot portion thereto.

Among the objects of my invention are to avoid certain of the above mentioned objections to methods heretofore employed in producing the results stated, and to provide a method that is free from such objections and is an improvement generally in the production of full fashioned stockings.

Another object of the invention is to provide a mechanism operative in the production of knitted fabrics that includes yarn loop manipulating implements, and means including relatively movable elements for providing on the loop manipulating implements walewise spaced rows of yarn loops, such as the instep and free end heel tab loops above mentioned, together with a selvage edge of the fabric between said rows of loops for the knitting of further loops to the loops of the spaced rows and to the selvage edges.

Another object of the invention is to provide a novel bar for supporting series related loop manipulating implements, the bar including relatively movable sections, and means for moving the sections between, and holding them in, different relative positions.

Another object of the invention is to provide a bar for supporting series related loop manipulating implements, the bar including relatively movable sections, and novel knockover bit structure in which the bits, or certain thereof, have special movement in accordance with the relative movement of the bar section.

Another object of the invention is to provide a method of producing a knitted fabric, or of effecting a transition from one knitted fabric area to another, which comprises placing, on a series of yarn loop manipulating implements, yarn portions, such as the instep loops and inside heel tab selvages above mentioned, placing another row of loops, such as the free end heel tab loops, on another series of loop manipulating implements movable relative to the first series, and moving the series relative to each other to place both of the loop rows and the selvage edge in line with each other.

Another object of the invention is to provide a novel mechanism, operative in the production of knitted fabrics, that is simple and durable in construction, economical to manufacture, and effective in its operation.

With these and other objects in view, which will become apparent from the following detailed description of the illustrative embodiment of the invention shown in the accompanying drawings, my invention resides in the novel elements, method steps, features of construction and arrangement of parts in cooperative relationship, as hereinafter more particularly pointed out in the claims.

Figures 1, 2, 3:
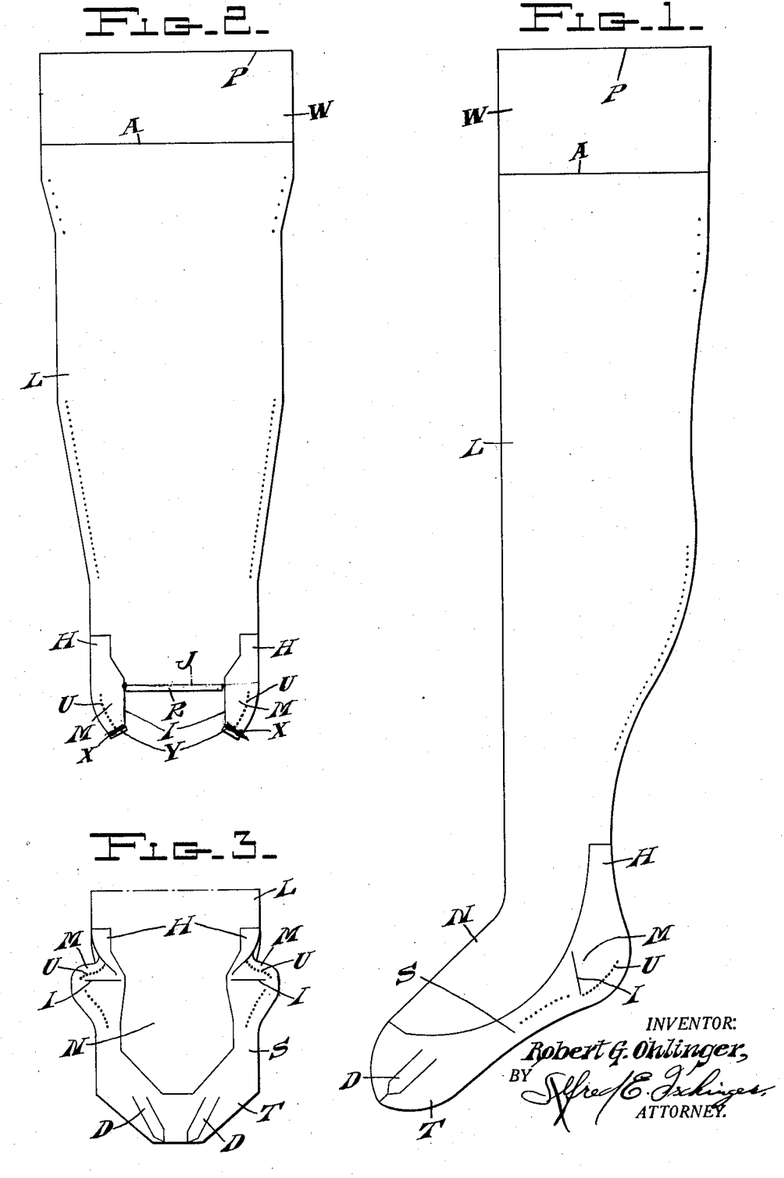
Figure 1 is a side elevational view of a full fashioned stocking in its flat folded form and constructed by means including the means of my invention, the welt being of double layer thickness.
Fig. 2 is a plan view of the blank of the leg portion of the stocking of Fig. 1.
Fig. 3 is a plan view of the foot portion of the blank from which the stocking is formed, showing at the upper portion thereof a lower portion of the leg blank seen in Fig. 2.

Referring to Fig. 1, the stocking illustrated comprises, in general, a top or picot edge P, a welt W, a welt line A, a leg L, heel areas H, an instep portion N, a sole portion S, and a toe area T including diamond point toe areas D. The stocking is made up of the leg blank of Fig. 2, a lower portion of which is also shown at the upper portion of Fig. 3, produced on a legger machine, and the foot blank portion at the lower end of Fig. 3, produced on a footer machine.

The production of the leg blank is effected in the usual manner by knitting through the welt W, the leg portion L to the heel areas H. Heel areas H and the lower leg and instep areas therebetween are then knitted as far as a line of an instep course J, after which a short ravel course area R is formed next to the central portion of course J, and heel tabs M are produced on the outer portions of course J as extensions of areas H.

In producing the tabs M, they are provided with straight walewise inner selvage edges I, and narrowed, as indicated by fashion marks U, to cause the outer edges to turn toward the center of the blank and to provide short topping on courses X angularly related to the instep course J and to the edges I. Ravel areas Y are provided next to courses X.

After the leg blank has been produced, as shown in Fig. 2, it is topped onto a topping machine of the invention, in which the course J and the edges I are topped in line with each other on loop manipulating implements of a main central bar section, and the courses X are topped onto loop manipulating implements of bar sections at opposite ends of the central bar section, after which the end sections are turned into alignment with the central section for transferring the blank to a single rigid transfer bar after which it is transferred to the needles of a footer machine. After being transferred to a footer machine, and the foot portion completed as shown in Fig. 3, the blank may be given its final stocking form with a single continuous seaming operation from the looped toe portion to the usual position in the welt W, and have closer conformity to the wearer's foot by eliminating the familiar peak in the rounded portion of the heel.

Referring to Figs. 4, 5, 6 and 7, a means for accomplishing the above mentioned topping of the course J, the edges I and the courses X in alignment with each other, includes a topping bar structure B made up of a main central section and end sections movable relative to the central section.

Figure 4:
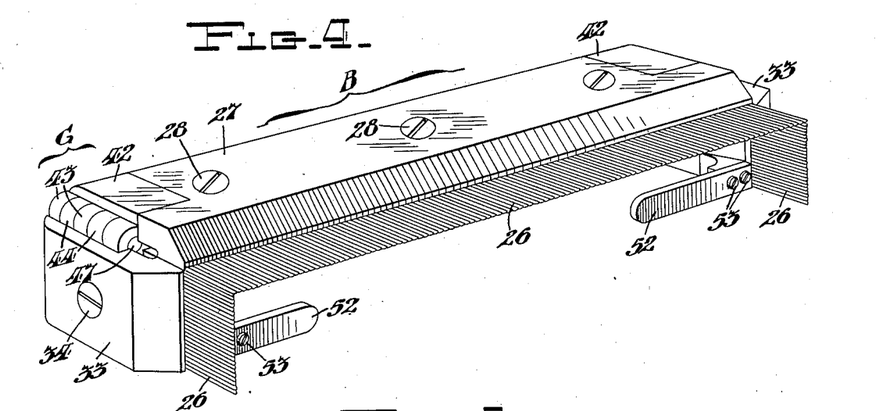
Fig. 4 is a perspective view of a topping bar embodying the invention.
Figure 5:
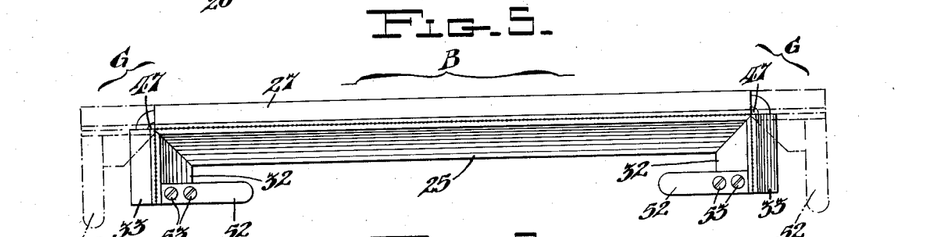
Fig. 5 is a view, in front elevation, of the bar of Fig. 4 showing the parts in full lines as related in Fig. 4, and in dot-and-dash lines as related during one stage of operation.
Figure 6:
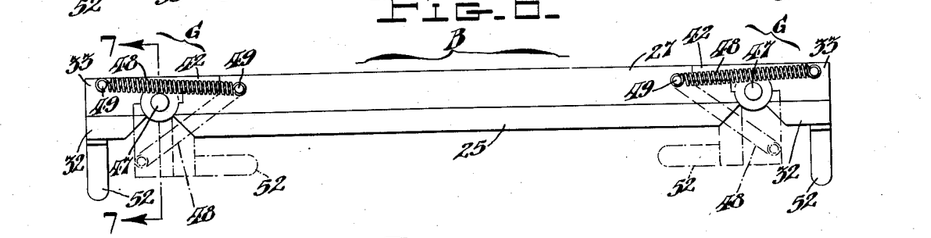
Fig. 6 is a view, in rear elevation, of the device of Fig. 5, showing the parts in full and dot-and-dash lines in positions corresponding to those of Fig. 5.
Figure 7:
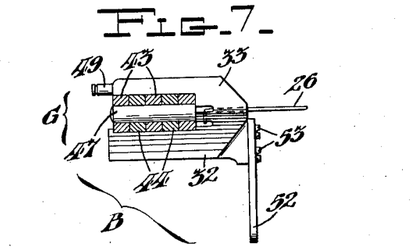
Fig. 7 is a view, partially in cross section and partially in elevation, taken substantially along the line 7—7 of Fig. 6.
Figure 8:
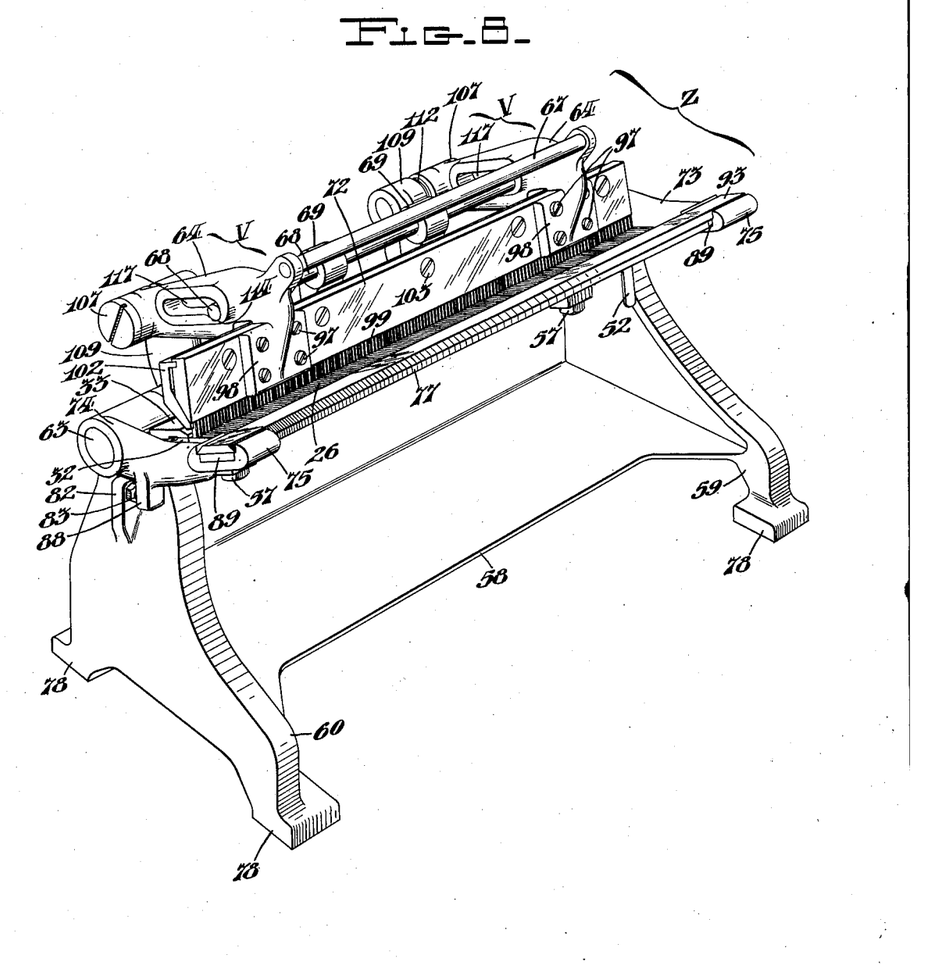
Fig. 8 is a perspective view of a topping machine including the bar of the previous figures.

As shown, the central section comprises a needle bar 25 against which loop manipulating implements or needles 26 are held by a clamp 27 and screws 28.

Similarly, each end section comprises a short bar 32 against which other loop manipulating implements 26 are held by a clamp 33 and a screw 34. Adjacent end surfaces of the bars 25 and 32, respectively, are sloped at angles of forty-five degrees to the needle or implement line whereby these surfaces act as limiting stops for each other when the end sections are moved out of line with the central section to positions at right angles thereto.

A hinge G, one of which is provided between each end bar section and the central bar section, comprises a plate 42 having sleeve portions 43 spaced from each other for interfitting with similar sleeve portions 44 of a hinge plate on the adjacent end bar section along hinge pins 47. A tension spring 48 is provided at each end of the bar B between pins 49 on the clamps 27 and 33, respectively, whereby to provide an over center or snap action of the end sections in both directions of the hinge movement. As indicated in full lines in Fig. 6, when the end and central bar sections are in alignment with each other, the springs 48 are at one side of the hinge pivot pins 47 above the pins to hold the bar sections in line. As indicated in dot and dash lines, the springs 48 are at an opposite side of the hinge pivot pins 47 below the pins to hold the bar sections out of line. Handles 52, secured to the bars 32 as by screws 53, are provided to facilitate manipulation of the end sections.

Referring to Figs. 8 to 15, inclusive, a topping machine Z, on which the bar B is mounted as by screws 57, comprises, in general, a base 58 including right and left stands 59 and 60, respectively, a shaft 63, a swinging frame V including arms 64, a handle bar 67, a cam bar 68 mounted in brackets 69 on the base 58, a knockover bit bed 72, and right and left transfer bar holders 73 and 74, respectively, secured to the shaft 63 for removably holding a transfer bar 77.

The base 58 comprises legs 78, the stands 59 and 60, bearings 79 for the shaft 63, side lugs 82 for stop screws 83, bosses 84 for the screws 57, and a sloping rear ledge 87.

The transfer bar holders 73 and 74 are in the form of levers pivotally mounted by the shaft 63 and having dogs 88 thereon for engagement with the screws 83. At the forward, or free, ends of the holder levers 73 and 74, bar receiving portions 75 are provided in which inlaid inserts 89 are adjustably held in position by screws 92 in slots 95 of the portions 75 (Fig. 12) for accurately fitting the transfer bar 77 lengthwise to the holders, such that points 94 on the bar 77 are properly aligned with the implements 26 on the topping bar B. A transfer bar clamp 93 has ends extending beyond the ends of the bar 77 merely resting in position in the holders 73 and 74, with ends of the bar 77 proper (Fig. 14) against the inserts 89, in position to be freely lifted out of the holders.

The knockover bit bed 72 is secured, by screws 97, to shoulder portions 98 of the arms 64, and supports knockover bits 99 which are held to the bed by clamps 102 and screws 103.

Figures 10, 11, 12:
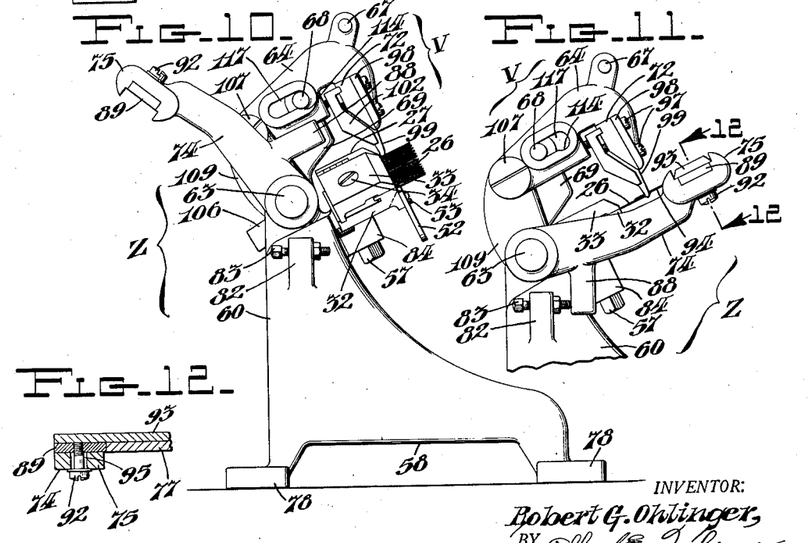
Fig. 10 is a view in end elevation, viewed from the left of Fig. 9.
Fig. 11 is a view of the upper portion of the device as viewed in Fig. 10, the parts being in different positions.
Fig. 12 is a detail cross sectional view taken along the line 12—12 of Fig. 11.
Figure 13:
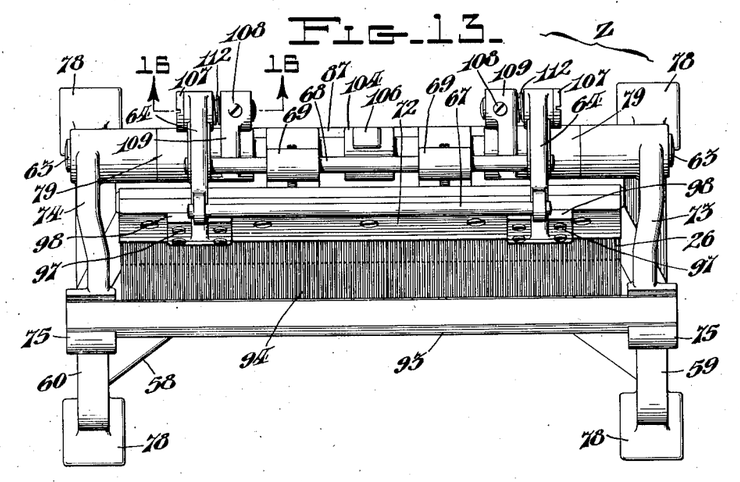
Fig. 13 is a top plan view of the mechanism shown in Fig. 9 with the parts in the position of Fig. 8.

Fixed to the shaft 63, is a sleeve 104 having a dog 106 (Figs. 10 and 13) for engaging the sloping rear ledge 87 of the base 58, whereby to limit rearward or counterclockwise movement of the transfer bar holders 73 and 74, as viewed in Fig. 10, to inactive positions.

The arms 64 are each pivotally connected, by a headed pin 107 and a set screw 108, to one end of a link 109, the other end of which is loosely mounted on the shaft 63. As better seen in Fig. 16, a helical spring 112 surrounds each pin 107, in a recess in the corresponding arm 64, and so acts between the arm 64 and the link 109 as to bias the arm 64 rearwardly, or counterclockwise, as viewed in Figs. 9, 10, 11, 14 and 15, so that, as viewed in Figs. 8 and 10, the stationary cam bar 68 is in a depression or notch 114 in a cam or slot portion 117 of the arm 64, this being the relaxed or initial position of the parts.

As seen in Figs. 9, 17, 18 and 19, screws 118, provided one near each end of the topping bar B, are each adapted for selective positioning in any one of a plurality of tapped holes 119 in an apron 122 of the base 58, whereby the hinged end sections of the topping bar, instead of folding back ninety degrees from the central section, as shown in Fig. 4, may be adapted to fold back through any of different angles, and be held by the screw 118 in an advantageous position for topping the loops of one of the courses X onto the needles 26 of the adjacent topping bar end section.

Figure 17:
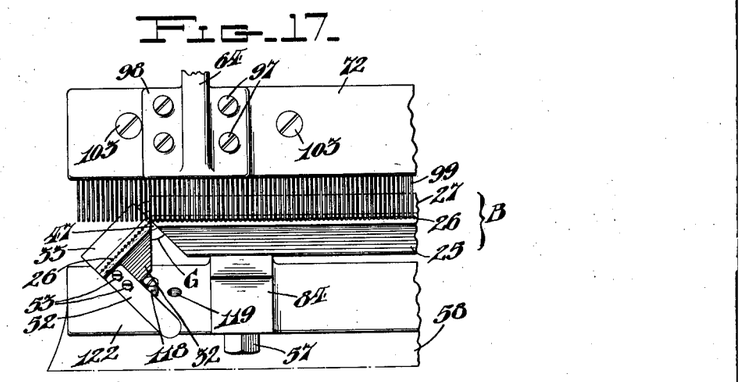
Figs. 17, 18 and 19 are fragmentary detail portions of the left end of the device of Fig. 9 showing progressive steps of operation.
Figure 20:
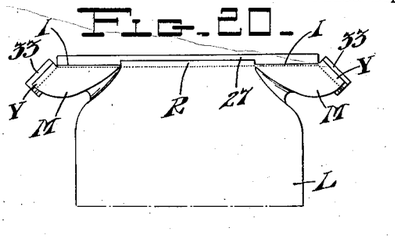
Fig. 20 is a diagrammatic view of a portion of a leg blank and of mechanism parts during the process of topping; the mechanism parts corresponding in position to the positions of the parts as shown in Figs. 9 and 17.

In operation, referring to Figs. 2, 10, 17 and 20, after the leg blank has been pressed off the needles of the legger machine, and with the blank formed as shown in Fig. 2, the topping bar B is conditioned as indicated in Figs. 17 and 20, with the end sections diagonal to the central section, and held against the screws 118 by the springs 48. At this time also, the transfer bar is off the machine, and the transfer bar holders are in inactive position, ss indicated in Fig. 10.

Figure 9:
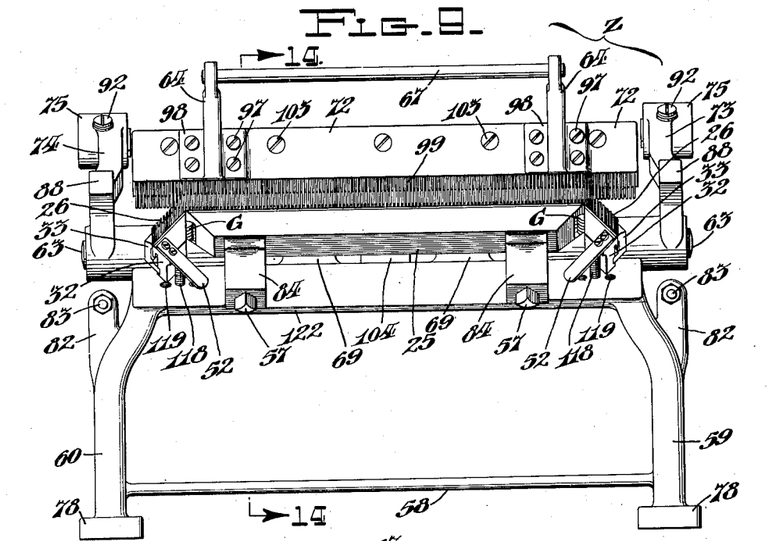
Fig. 9 is a front elevational view of the machine of Fig. 8 with the transfer bar removed and other parts in different positions.
Figure 21:
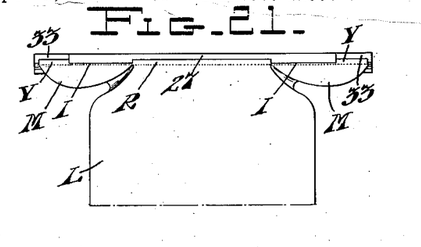
Fig. 21 is a diagrammatic view of the leg blank portion and of parts of the mechanism of Fig. 20 in subsequent positions of operation different from the positions of the corresponding parts as shown in Figs. 8 and 18.

The loops of the instep course J, and the inner selvage edges I of the heel tabs, are topped onto the loop manipulating implements 26 of the central section of the topping on bar B, thereby being brought into line with each other, as indicated in Fig. 20. Also, the short free end courses X of the heel tabs are topped onto the loop manipulating implements 26 of the end topping on bar sections, while the latter are diagonal to the central section, as indicated in Figs. 9, 17 and 20, whereupon, by manipulation of the handles 52 the end topping on bar sections are pivoted about the hinge pins 47 until the springs 48 pass from the dot and dash line positions to the full line positions of Fig. 6. This action places all of the loops of the instep course J, the selvage edges I, and the courses X in one straight line, as indicated in Fig. 21, after which the loops of the areas R and Y are ravelled down to the courses J and X, respectively.

Figures 14, 15, 16:
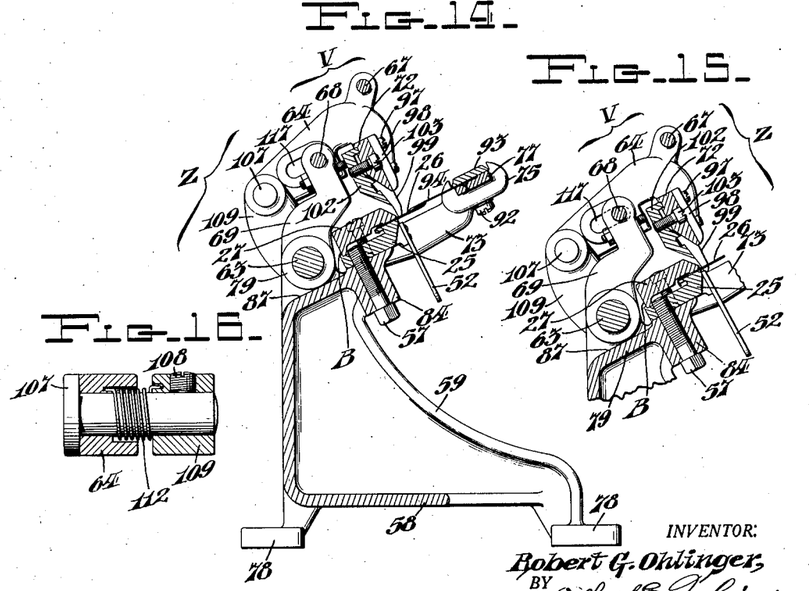
Fig. 14 is a cross sectional view taken substantially along the line 14—14 of Fig. 9.
Fig. 15 is a cross sectional view of the upper portion of the device as shown in Fig. 14, the parts being in different positions.
Fig. 16 is a cross sectional view taken substantially along the line 16—16 of Fig. 13, slightly enlarged relative thereto.
Figure 19:
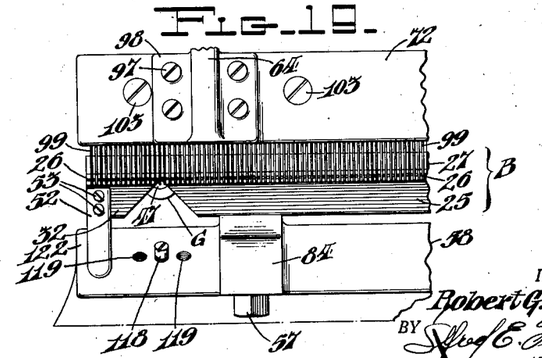
Figures 22, 23:
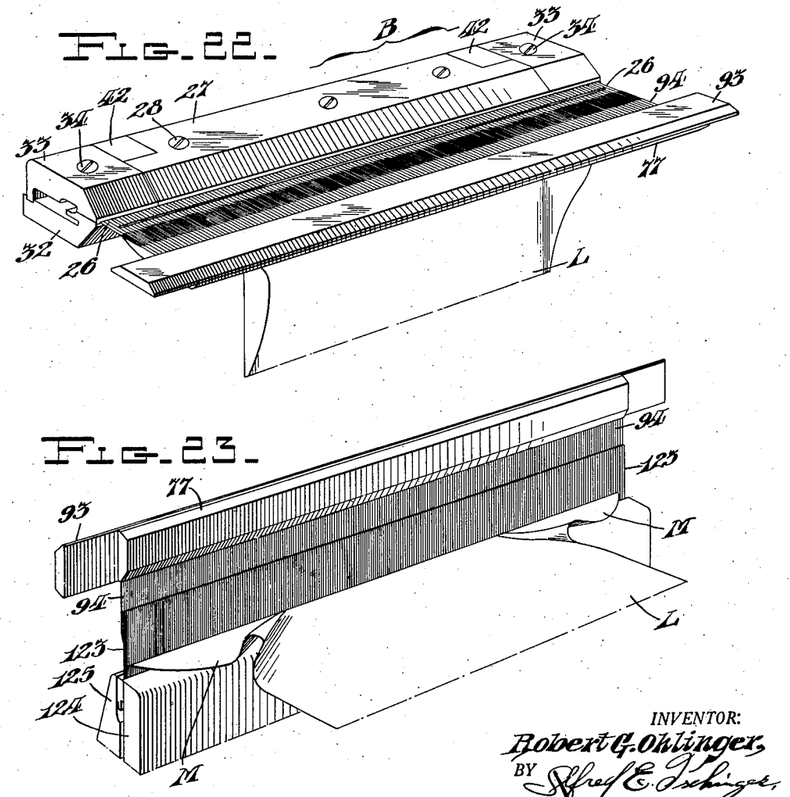
Fig. 22 is a perspective view of the topping bar and a cooperating transfer bar, together with a portion of a stocking blank, with the parts in position corresponding to the position of parts in Figs. 13 and 14.
Fig. 23 is a perspective view along the transfer bar in the act of transferring the leg blank to the needles or loop manipulating implements of a footer machine.
Figure 24:
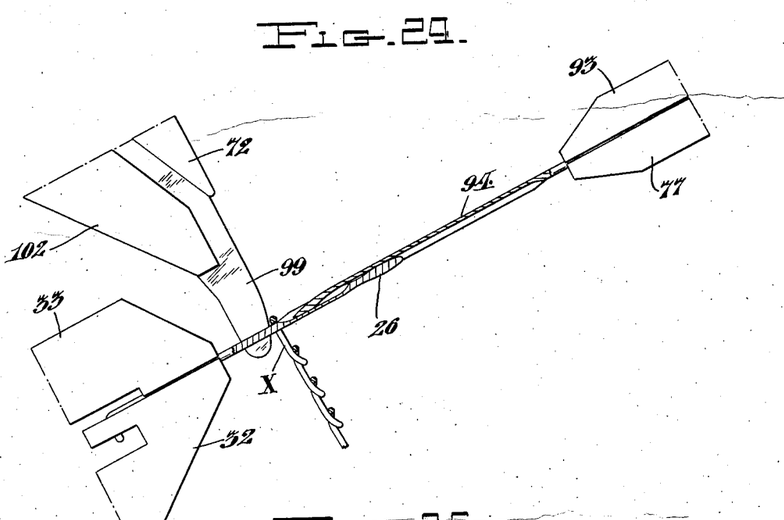
Fig. 24 is an enlarged detail view of the loop manipulating implements of the topping and transfer bars, and the knockover bits, as viewed in Fig. 11, but as positioned in Fig. 15.
Figure 25:
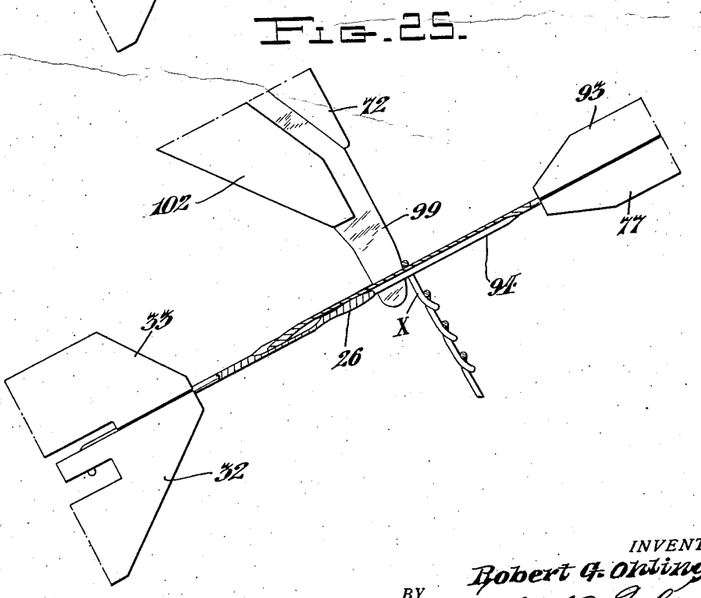
Fig. 25 is a view similar to Fig. 24, with the parts positioned as in Fig. 11.

Next, the transfer bar holders 73 and 74 are brought forward, from the positions thereof of Figs. 9 and 10, to the position thereof of Figs. 11, 13, 14 and 15, for the reception of the transfer bar 77. With the latter in place, the handle bar 67 is then grasped and pulled forwardly, in doing which, the stationary cam rod 68 is first thrown out of the notches 114 to cause an initial dip of the knockover bits 99, as indicated in Figs. 15, 19 and 24, to a lower position between the implements 26 of the topping on bar B. Continued forward movement of the handle bar 67 then moves the knockover bits 99, while in the lowered position, along the implements 26 to transfer the loops of the courses J and X, and the selvage edges I onto the implements of the transfer bar 77, as shown in Fig. 25. As shown in Fig. 22, the implements 94 are in position to thus receive the loops of the course J, the selvage edges I and the loops of the courses X.

When the handle bar 67 is released, the springs 112 return the arms 64 to position in which the stationary cam bar 68 is in the notches 114, and the knockover bits 99 are raised relative to the implements 26.

Figure 18:
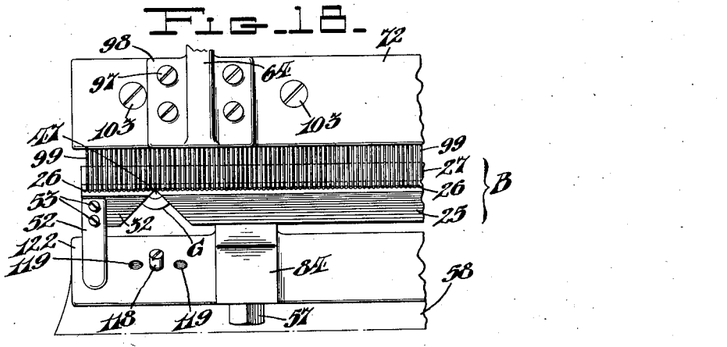

Having the knockover bits 99 in raised position is to enable the needles 26 of the topping on bar end sections to clear the bits in their pivoting or angular movement from the position of Fig. 17 to the position of Fig. 18, as otherwise the implements 26, approaching the knockover bits 99 along an arc intercepting the straight lines of the bits too soon, would result in damage to the implements and bits. It is necessary to have the bits in the lower positions of Fig. 19, to ensure good contact of the bits 99 with the loops, in pushing the loops along the implements 26 to the points 94.

With the leg blank thus mounted on the transfer bar, the latter is taken to the position of Fig. 23 which indicates the further operation of transferring the fabric to a footer machine from the points of the tranfer bar to needles 123, which are held to a needle bar 124 by a clamp 125.

Upon the completion of knitting and fashioning in the footer machine to form the lower portion of the blank of Fig. 3, the blank is complete, ready for looping in the toe portion, and prepared for seaming, in a single continuous seaming operation, from the toe loopings to the picot edge P, forming the stocking of Fig. 1, with the rounded heel, as indicated, and free from the usual peak in this region.

Of course, the improvements specifically shown and described by which I obtain the above results, can be changed and modified in various ways without departing from the invention herein disclosed and hereinafter claimed.

I claim:

1. A device for use in transferring a full fashioned stocking leg blank from a legger to a footer machine, comprising loop manipulating implements, and means for supporting and manipulating row sections of said implements for receiving instep loops, the inside selvage edges of the heel tabs and free end loops of the heel tabs, said implement row sections including sections movable out of alignment with each other to effect said reception and into alignment with each other providing for the topping of said loops and edges onto needles of the footer machine.

2. A device for use in transferring a full fashioned stocking leg blank from a legger to a footer machine, comprising loop manipulating implements, and means for supporting and manipulating row sections of said points for receiving instep loops, the inside selvage edges of the heel tabs and free end loops of the heel tabs, said implement row sections including sections movable out of alignment with each other to effect said reception, and means for relatively moving said relatively movable point row sections into alignment with each other providing for the topping of said loop rows and said edge onto needles of the footer machine.

3. A device for use in transferring a full fashioned stocking leg blank from a legger to a footer machine, comprising loop manipulating implements, and means for supporting and manipulating row sections of said implements for receiving instep loops, the inside selvage edges of the heel tabs and free end loops of the heel tabs, said implement row sections including sections movable out of alignment with each other to position for effecting said reception and into alignment with each other to position providing for the topping of said loop rows and said edge onto needles of the footer machine, and means for holding said sections in the relation thereof at one of said positions.

4. A device for use in transferring a full fashioned stocking leg blank from a legger to a footer machine, comprising loop manipulating implements, and means for supporting and manipulating row sections of said implements for receiving instep loops, the inside selvage edges of the heel tabs and free end loops of the heel tabs, said implement row sections including sections movable out of alignment with each other to position for effecting said reception and into alignment with each other to position providing for the topping of said loop rows and said edge onto needles of the footer machine, and means for holding said sections in the relation thereof at each of said positions.

5. A device for use in transferring a full fashioned stocking leg blank from a legger to a footer machine, comprising loop manipulating implements, and means for supporting and manipulating row sections of said implements for receiving instep loops, the inside selvage edges of the heel tabs and free end loops of the heel tabs, said implement row sections including sections movable out of alignment with each other to position to effect said reception and into alignment with each other to position providing for the topping of said loop rows and said edge onto needles of the footer machine, and means including an over the center spring for moving said relatively movable sections toward, and holding them in, each of said positions alternately.

6. A device for use in transferring a full fashioned stocking leg blank from a legger to a footer machine, comprising loop manipulating implements, and means for supporting and manipulating row sections of said implements for receiving instep loops, the inside selvage edges of the heel tabs and free end loops of the heel tabs, said implement row sections including sections angularly movable out of alignment with each other to effect said reception and into alignment with each other providing for topping said loops and edges onto needles of the footer machine.

7. A device for use in transferring a full fashioned stocking leg blank from a legger to a footer machine, comprising loop manipulating implements, and means for supporting and manipulating row sections of said implements for receiving instep loops, the inside selvage edges of the heel tabs and free end loops of the heel tabs, said implement row sections including hinged sections movable out of alignment with each other to effect said reception and into alignment with each other providing for topping said loops and edges onto needles of the footer machine.

8. A device for use in transferring a full fashioned stocking leg blank from a legger to a footer machine, comprising loop manipulating implements, and means for supporting and manipulating row sections of said implements for receiving instep loops, the inside selvage edges of the heel tabs and free end loops of the heel tabs, said implement row sections including end and intermediate sections movable out of alignment with each other to effect said reception and into alignment with each other providing for topping said loops and edges onto needles of the footer machine.

9. A device for use in transferring a full fashioned stocking leg blank from a legger to a footer machine, comprising loop manipulating implements, means for supporting and manipulating a main central row section of said implements for receiving instep loops and the inside selvage edges of the heel tabs, and means movable out of alignment with said main implement row sections for supporting and manipulating end row sections of said implements for receiving free end loops of the heel tabs and movable into alignment with the main implement row section providing for topping said loops and edges onto needles of the footer machine.

10. A device for use in transferring a full fashioned stocking leg blank from a legger to a footer machine, comprising loop manipulating implements, means for supporting and manipulating a main central row section of said implements for receiving instep loops and the inside selvage edges of the heel tabs, and means for supporting and manipulating end row sections of said implements hinged to said main implement row section and movable out of alignment therewith for receiving free end loops of the heel tabs and into alignment with the main implement row section providing for topping said loops and edges onto needles of the footer machine.

11. In combination in a topping device, a base, a loop manipulating implement bar having a section stationarily mounted on the base, transfer bar supporting means movably mounted on the base, knockover bits movably mounted on the base, and means for operating the knockover bits toward and along the implements in said section including spring means normally holding the bits at a predetermined position with respect to the plane of implements in said section, an operating member and cam means operating between said operating member and the base against the spring means for moving the bits in the direction of said plane in response to operation of the bits along the implements.

12. In combination in a mechanism operative in the production of knitted fabrics, yarn loop manipulating implements, and means including elements movable relative to each other for providing on said implements walewise spaced angularly related rows of loops of a fabric area and a selvage edge of the area between said rows of loops for the knitting of a further fabric area the loops of a single course of which are knitted to the loops of said spaced rows and to said selvage edge.

13. In combination in a mechanism operative in the production of knitted fabrics, yarn loop manipulating implements, and means including elements movable relative to each other for providing on said implements walewise spaced loops caused to have angular relation by narrowing a portion of a fabric area and also providing on said implements a selvage edge of the area between said angularly related rows of loops for the knitting of a further fabric area the loops of a single course of yarn of which are knitted to the loops of said spaced angularly related rows and to said selvage edge.

14. The method of effecting a transition from one knitted fabric area to another, which comprises placing on a series of yarn loop manipulating implements a row of loops and a selvage edge of one area having one end at said row, placing another row of loops at the other end of said edge on another series of yarn loop manipulating implements movable relative to said first series, and moving said series of yarn loop manipulating implements relative to each other to place both said rows and said edge therebetween in line with each other.

15. The method of producing a knitted fabric, which comprises knitting adjoining areas having coursewise offset rows of loops providing one of the areas with a selvage edge intercepting at one of its ends an intermediate loop of one of the rows of the other area, placing said edge and a portion of said one row on a series of loop manipulating implements, placing a row of loops of said one area at the other end of said edge on another series of loop manipulating implements out of line with said first series, and moving said series to alignment with each other.

16. The method of effecting a transition from the leg portion to the foot portion of a full fashioned stocking blank, which comprises placing on a series of yarn loop manipulating implements the last row of instep loops of the leg portion and the inside selvage edges of the heel tabs, placing the last row of loops of each heel tab on one of two series of loop manipulating implements out of line with said first series, and moving said series relative to each other to a position of alignment with each other.

17. A method of making a stocking blank comprising knitting the upper portion as far as the instep, knitting heel tabs on said portion, placing the loops of the course to which said heel tabs are knitted and the loops along the inner edges of said heel tabs in alignment on a point row, placing the loops of the last course of each of the heel tabs in alignment on spaced relatively short point rows hinged to said row and lying at an angle thereto, swinging said short point rows into alignment with said first row, transferring all of the loops from said point rows to an aligned needle row, and then knitting the foot.

18. In combination in a topping device, a continuous row of parallel points equally spaced in the row, and relatively shorter rows of equally spaced parallel similar points hingedly mounted and adapted to occupy positions either as continuations of said row or at angles thereto, and means whereby said shorter rows are biased to either a position at a definite angle to said first row or to a position in which the shorter rows act as continuations of said first row as desired.

19. In combination in a topping device, a point bar having a stationary central section, relatively short point bar sections hingedly related to said central bar and adapted to occupy positions either as extensions of said central bar or at angles thereto, knockover bits mounted on an arm pivotally connected to a rotatable lever and biased to a position at one side of and near the butt portions of the points in said bar and adapted to be drawn forward toward the points thereof, said arm having a slotted guide therein, and fixed pin means cooperating with said guide for throwing said bits in between the points on said bar as the bits are drawn forward from the position toward which they are biased.

ROBERT G. OHLINGER.